United States Patent [19]

McArthur

[11] 4,269,171
[45] May 26, 1981

[54] BUILDING STRUCTURE AND INTEGRAL SOLAR ENERGY COLLECTING APPARATUS

[76] Inventor: William H. McArthur, P.O. Box 236, Forest City, N.C. 28043

[21] Appl. No.: 945,318

[22] Filed: Sep. 25, 1978

Related U.S. Application Data

[63] Continuation-in-part of Ser. No. 827,948, Aug. 26, 1978, Pat. No. 4,184,476.

[51] Int. Cl.³ .............................................. F24J 3/02
[52] U.S. Cl. .................................. 126/429; 126/431; 126/450; 34/93
[58] Field of Search ............... 126/428, 429, 430, 431, 126/432, 450; 34/93, 86, 219; 165/45, 48 S

[56] References Cited

U.S. PATENT DOCUMENTS

| | | | |
|---|---|---|---|
| 2,559,869 | 7/1951 | Gay | 126/429 |
| 3,231,986 | 2/1966 | Touton | 34/93 |
| 4,054,246 | 10/1977 | Johnson | 126/429 |
| 4,062,346 | 12/1977 | Rapp, Jr. et al. | 126/431 |
| 4,083,360 | 4/1978 | Courvoisier et al. | 126/450 |
| 4,098,260 | 7/1978 | Goettl | 126/429 |
| 4,099,338 | 7/1978 | Mullin et al. | 126/428 |
| 4,114,288 | 9/1978 | Fowler | 34/93 |
| 4,137,898 | 2/1979 | Koizumi et al. | 126/429 |
| 4,141,339 | 2/1979 | Weinstein | 126/450 |
| 4,171,694 | 10/1979 | Parker | 126/450 |
| 4,184,476 | 1/1980 | McArthur | 126/429 |

FOREIGN PATENT DOCUMENTS

| | | | |
|---|---|---|---|
| 929784 | 7/1973 | Canada | 126/429 |
| 2651847 | 5/1977 | Fed. Rep. of Germany | 126/429 |
| 2274879 | 1/1976 | France | 126/429 |

Primary Examiner—James C. Yeung
Attorney, Agent, or Firm—Bell, Seltzer, Park & Gibson

[57] ABSTRACT

A solar energy collecting apparatus which is integrally incorporated into a conventional building structure so that it does not protrude from the normal contour of the building, and which utilizes components of the building structure as a part of the collecting apparatus to thereby minimize the cost thereof. The collecting apparatus includes solar energy absorptive panels which are adapted to be mounted between the conventional support members in the wall or roof of a building, and wherein the absorptive panels and support members define in part an air passageway, whereby air may be passed along the absorptive panel to absorb heat therefrom. The inlet of the passageway has provision for admitting predetermined relative quantities of outside and inside air, and the outlet of the passageway communicates with a plenum chamber inside the building so that the heated air from several such passageways may be efficiently collected and utilized.

19 Claims, 14 Drawing Figures

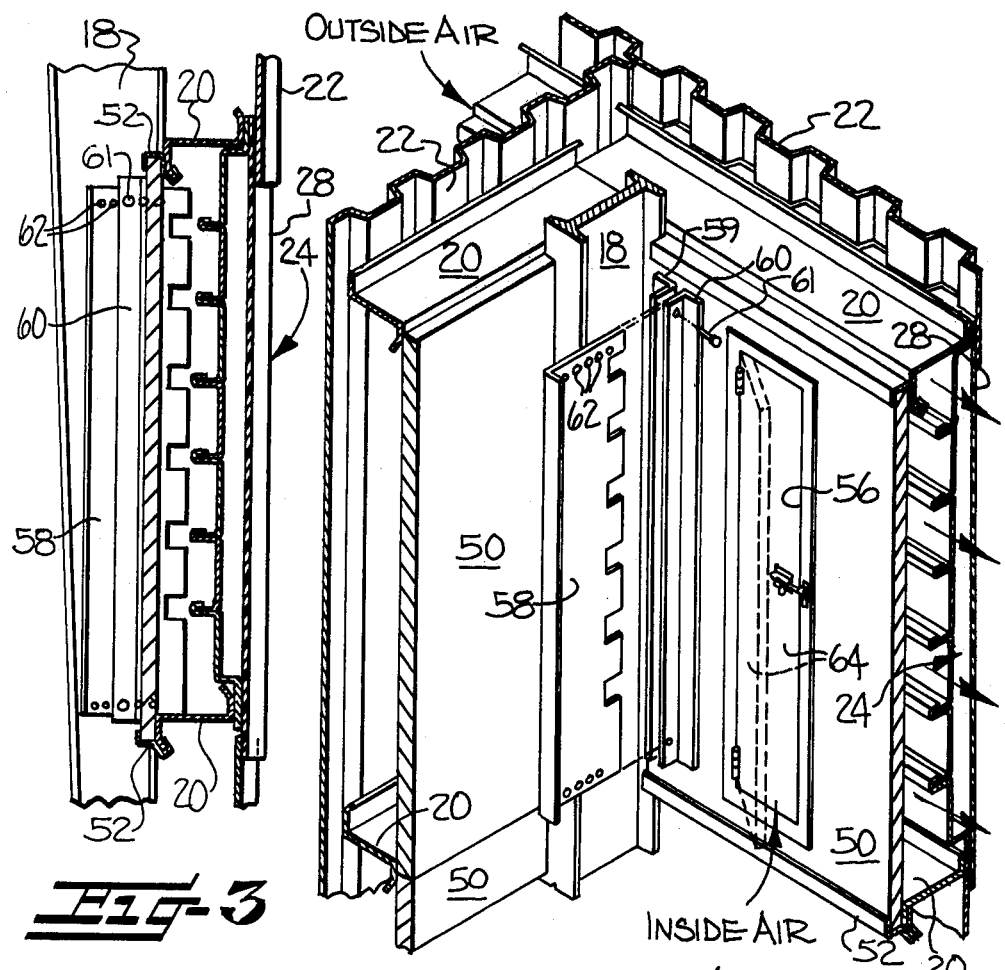
Fig-3
Fig-4
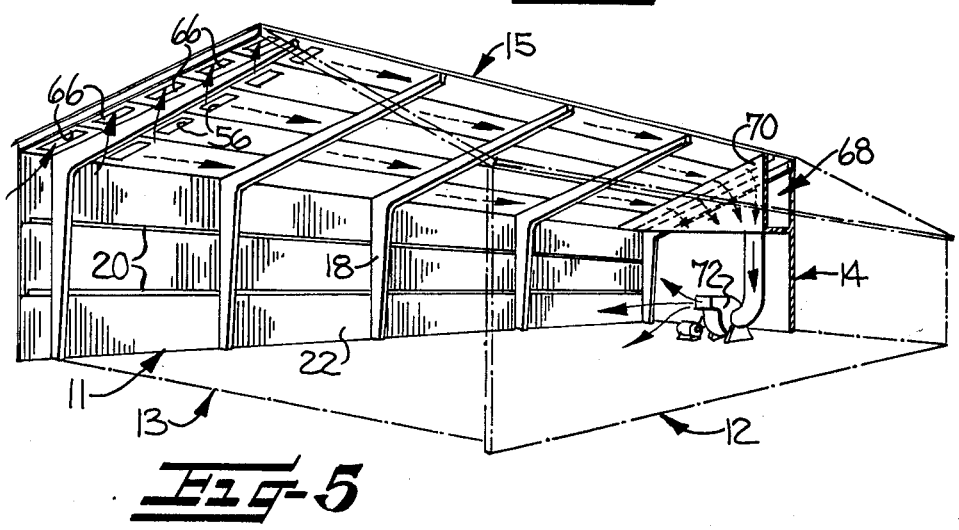
Fig-5

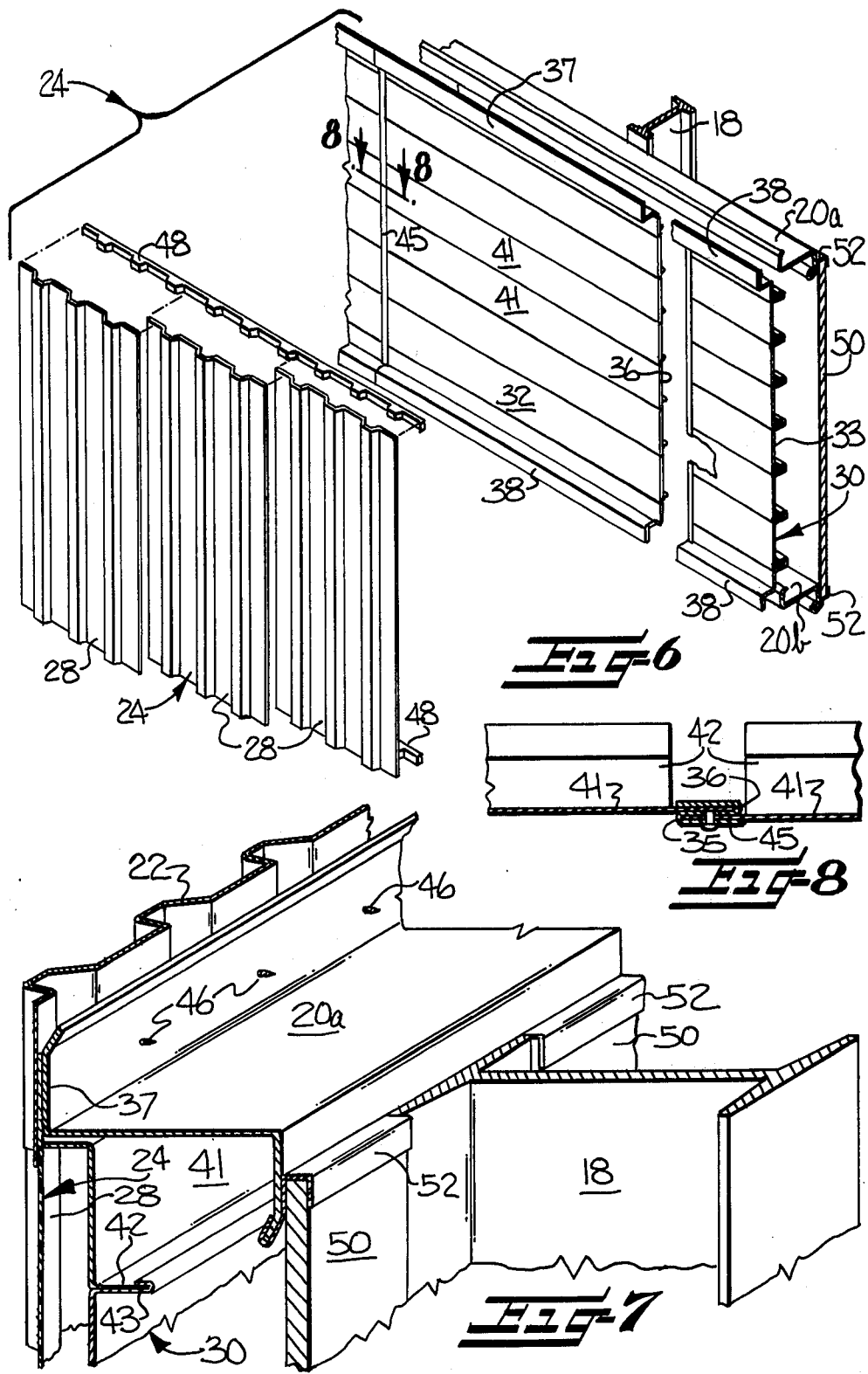

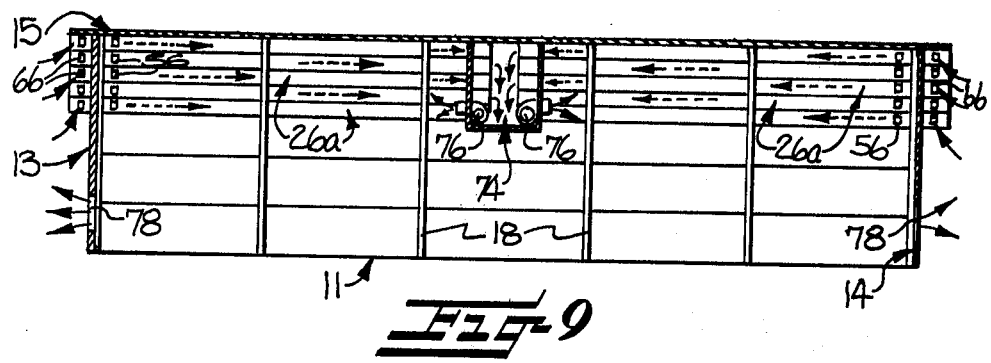
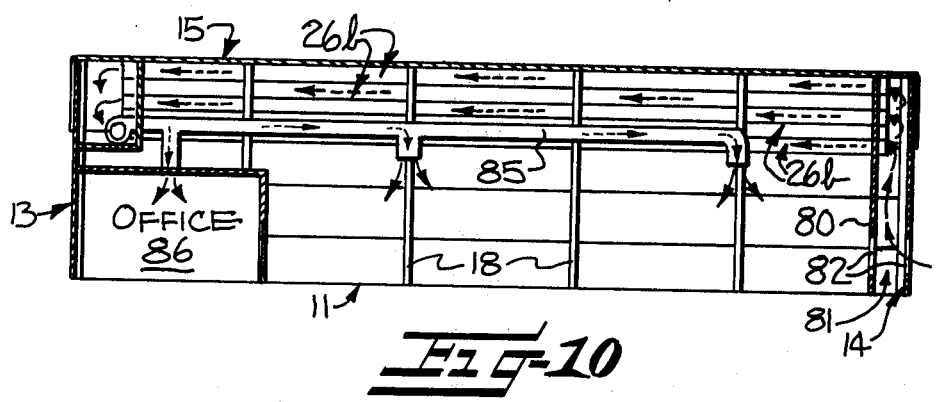
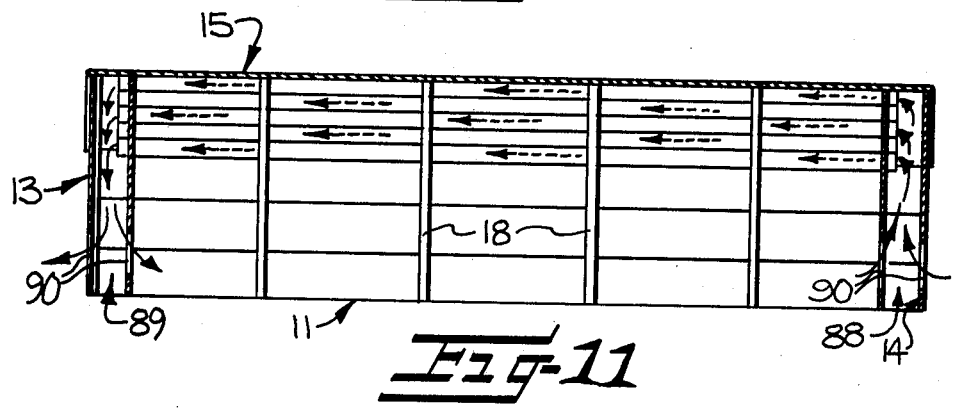
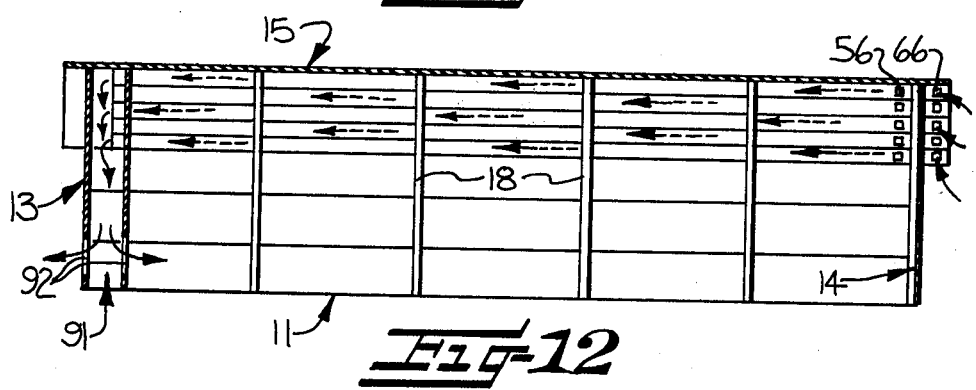

BUILDING STRUCTURE AND INTEGRAL SOLAR ENERGY COLLECTING APPARATUS

This application is a continuation in part of copending application Ser. No. 827,948 filed Aug. 26, 1977, now U.S. Pat. No. 4,184,476.

The present invention relates to a building structure having the solar energy absorptive panel integrally incorporated therein.

In recent years, solar heating systems for collecting, storing and distributing the sun's heat energy to the interior of a building have been the subject of considerable developmental activity. Typically, known systems include solar collectors in the form of large rectangular frames which are placed directly on a roof or wall of the building, and which comprise a sheet metal solar energy absorber, a covering sheet of glass or plastic which is transparent to solar radiation, and an insulating material behind the absorber. In an air type collector, air is adapted to be passed along the absorber so as to absorb heat therefrom, and the heated air is then ducted directly into the interior of the building or to a heat storage unit. In a liquid type collector, water or similar liquid is passed through channels attached to the absorber, and then is piped to a heat transfer unit or storage unit.

The above described conventional solar collectors possess several disadvantages which have hindered widespread acceptance and use. Among these disadvantages is the high initial cost of the collectors, and the fact that expensive changes are often required in the building structure to accommodate the collectors. Further, the collectors protrude from the normal exterior of the building, and are often unsightly.

In applicant's above identified copending application, there is disclosed a building wall structure which integrally incorporates a solar collector, and which effectively overcomes the above problems associated with the prior art collectors. More particularly, the copending application discloses a solar collector which utilizes, as an integral part of the collector, the parallel, spaced apart structural support members of a conventional building, as well as exterior panels which generally match the configuration of the panels which cover the remainder of the building. These novel structural features serve to significantly reduce the cost of the collector, and also result in a configuration which does not protrude from the normal contour of the building.

The present invention relates to a further improvement of the building wall structure as described in the above identified copending application. In particular, it has been found that the prior collector structure requires rather extensive ductwork at the outlet end of the collector in order to direct the heated air to a desired location, particularly where a number of parallel collectors are employed in the wall or roof structure. Also, the collectors had no provision for readily balancing the air flow through the collectors between outside and inside air.

It is accordingly an object of the present invention to provide a low cost solar energy collecting apparatus which overcomes the above disadvantages of the prior collectors.

It is a more particular object of the present invention to provide a solar collecting apparatus which may be built into the roof or exterior wall of a standard building, such as a conventional prefabricated metal building, and without changing the normal contour of the exterior of the building.

It is also an object of the present invention to provide a solar collecting apparatus which utilizes certain of the structural components of a conventional building as a part of the solar collector, to thereby minimize cost of the collector.

It is a further object of the present invention to provide a solar collecting apparatus which avoids the need for extensive ductwork where several collectors are employed, and which has provision for balancing outside air and inside return air through the collector.

These and other objects and advantages of the present invention are achieved in the embodiments illustrated herein by the provision of a building structure having at least one wall structure which comprises a plurality of parallel, spaced apart structural support members, exterior panels which are transparent to solar radiation mounted along the outside edges of two adjacent support members, solar energy absorptive panels mounted to extend between the two adjacent support members and underlying the transparent panels, and an air passageway defined in part by the solar energy absorptive panels and the two adjacent support members and extending along the length of the support members. The passageway includes inlet means adjacent one end thereof and outlet means adjacent the opposite end thereof, and a plenum chamber is preferably disposed within the building enclosure and communicating with the outlet means of the passageway. By this arrangement, solar energy is able to pass through the transparent exterior panels and warm the absorptive panels, and the air passing through the passageway absorbs heat from the absorptive panels and exhausts into the plenum chamber.

In a preferred embodiment, the inlet means includes a first opening communicating with the outside air and a second opening communicating with the inside of the building structure, and means for selectively admitting predetermined relative portions through each opening.

Some of the objects having been stated, other objects will appear as the description proceeds, when taken in connection with the accompanying drawings in which:

FIG. 3 is a fragmentary sectional elevation view of a portion of the exterior wall of the building structure, taken substantially along the line 3—3 of FIG. 2, and illustrating the solar energy collection apparatus of the present invention;

FIG. 4 is a fragmentary exploded perspective view illustrating the inlet of the solar energy collection apparatus;

FIG. 5 is a view similar to FIG. 1 and illustrating a second embodiment of the present invention;

FIG. 6 is a fragmentary exploded perspective view of the solar energy collection apparatus;

FIG. 7 is a fragmentary perspective view of the portion of the solar energy collecting apparatus;

FIG. 8 is a fragmentary sectional plan view illustrating the structure by which the panels are interconnected, and taken substantially along the line 8—8 of FIG. 6;

Figure 13:
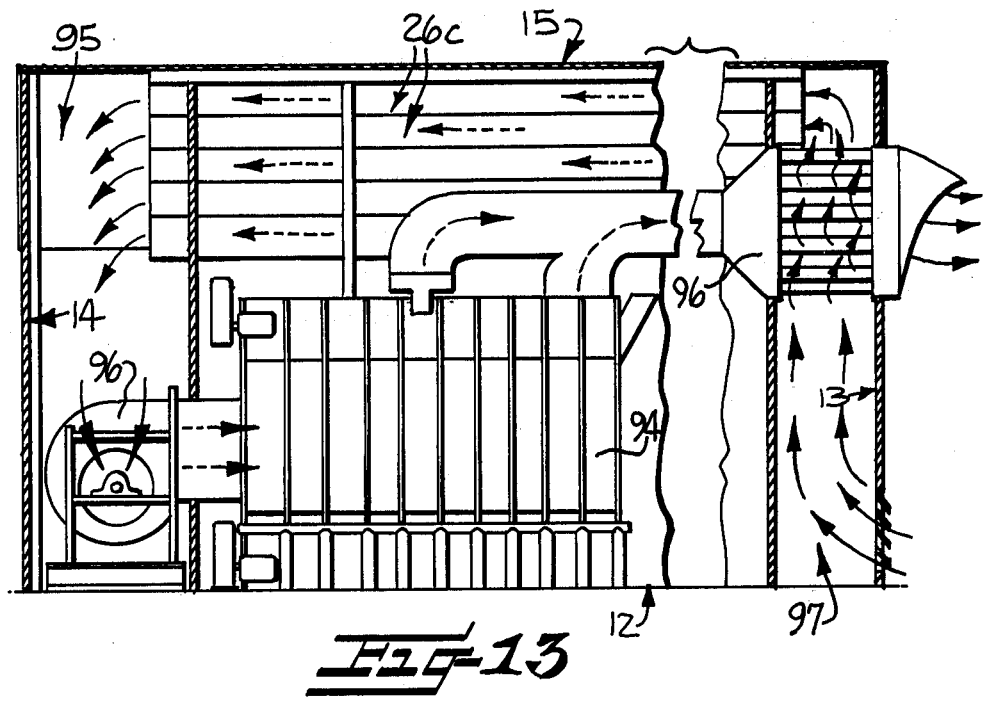
Figure 14:
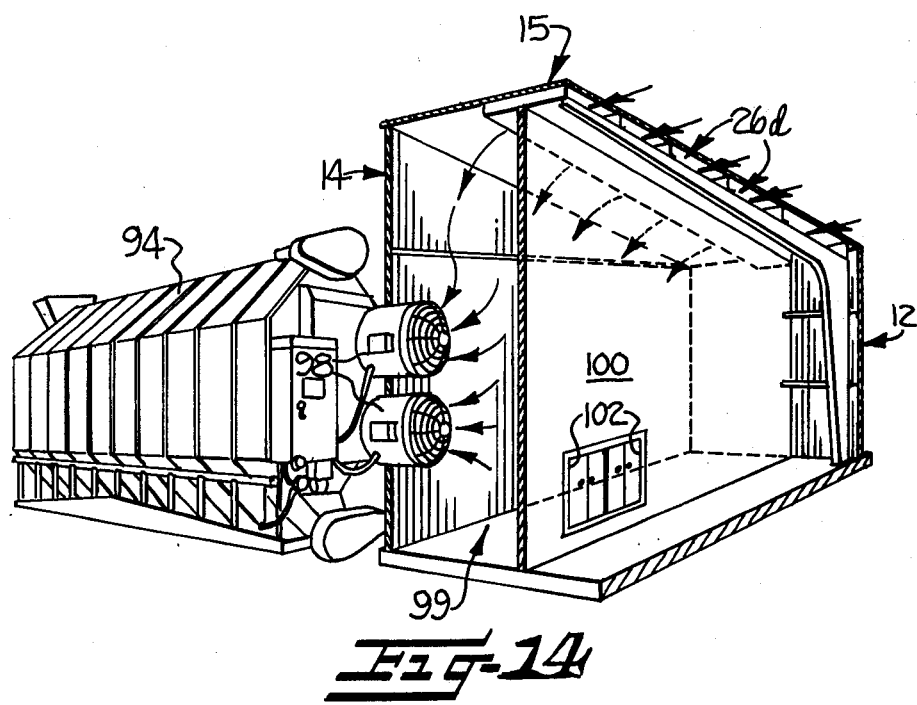

FIGS. 9, 10, 11, and 12 are sectional elevation views of different building structures which embody the present invention;

FIG. 13 is a sectional elevation view of a building structure embodying the present invention and which includes a crop drying apparatus; and FIG. 14 is a fragmentary sectioned perspective view of a building structure embodying the present invention, together with an exteriorally positioned crop drying apparatus.

Figure 1:
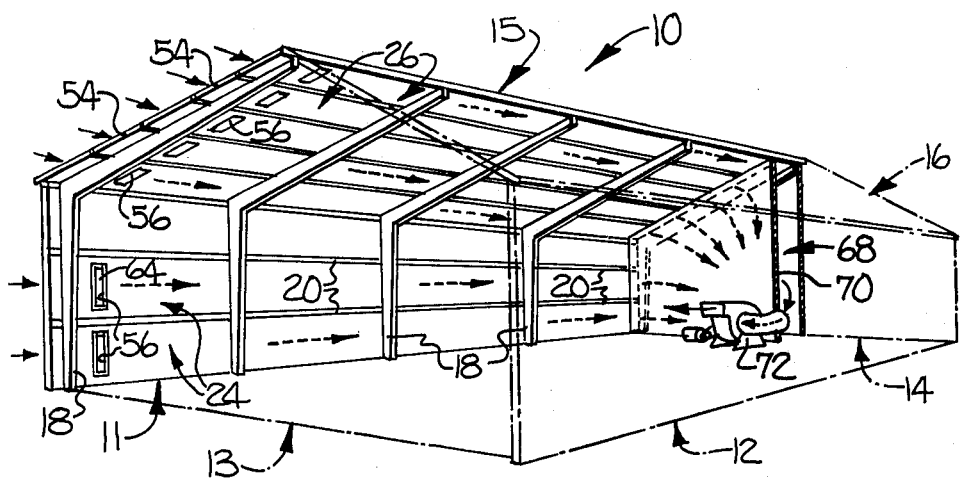
FIG. 1 is a fragmentary perspective view of the interior of a building structure embodying the present invention.
Figure 2:
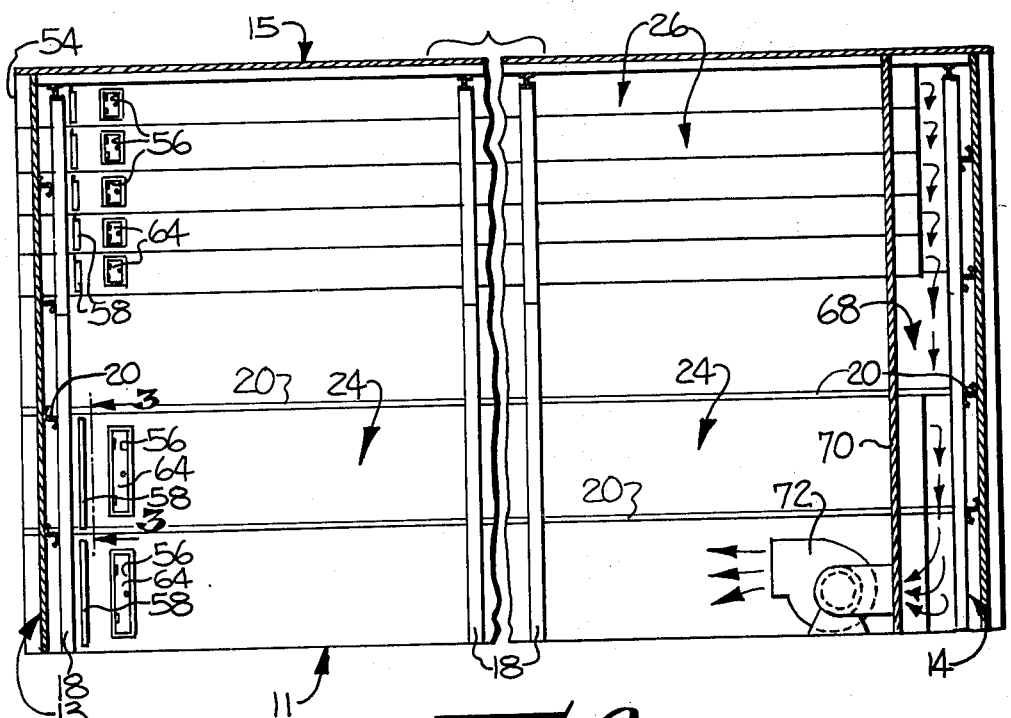
FIG. 2 is a sectional elevation view of the interior of the building structure shown in FIG. 1.

Referring more specifically to the drawings, FIG. 1 illustrates a building structure 10 which embodies the features of the present invention. The building structure comprises a plurality of exterior wall structures which collectively define an enclosure therebetween, and more particularly, the wall structures include a pair of opposite side walls 11, 12, opposing end walls 13, 14, and two roof walls 15, 16.

Certain structural components of the several wall structures are essentially conventional, and as best seen in FIGS. 1 and 3, the conventional components include a plurality of spaced apart structural beams or columns 18 mounted on a foundation. In addition, a plurality of horizontal, spaced apart support members or purlins 20 are attached to and extend perpendicularly between the structural beams along the walls, as well as the roof of the building. In the side walls, the structural beams 18 are vertically disposed, while in the roof they are inclined.

The purlins 20 are essentially Z-shaped in cross-sectional configuration and are attached to the outside edges of the columns 18. A plurality of rectangular exterior panels 22 (FIG. 3) are mounted in an overlapping side-by-side arrangement to the outside edges of the purlins to form the exterior surface of the side walls and roof walls. Typically, the columns 18 are spaced apart about twenty to twenty-five feet, and the purlins 20 are spaced about five feet from each other. The exterior panels 22 typically measure about three by eleven feet, and are fabricated from a metallic or opaque plastic sheet material having a corrugated cross-sectional configuration to improve the rigidity thereof.

In accordance with the embodiment of the invention as illustrated in FIG. 1, the side wall 11 and roof wall 15 of the building, and which face in a southerly direction, each integrally incorporate a number of solar energy collectors 24 and 26 respectively, with the collectors being characterized by the absence of components which protrude outwardly beyond the contour of the building structure. Also, it will be observed that in this embodiment the side walls 11, 12 and roof walls 15, 16 extend beyond the adjacent end walls of the building, to define an overhang at each end of the building. While a side wall collector 24 is described in detail herein, it will be appreciated that the roof wall collectors 26 are of similar construction.

The wall collector 24 includes a plurality of exterior panels 28 formed of a material transparent to solar radiation and mounted to the outside edges of two adjacent purlins 20a and 20b. The transparent exterior panels 28 are mounted in overlapping side-by-side arrangement along the length of the purlins, and they are preferably similar in cross-sectional configuration to the remaining exterior panels 22, such that the transparent panels 28 and remaining panels 22 are substantially co-planar and collectively define the exterior surface of the wall. Stated in other words, the transparent exterior panels 28 match the general appearance of the remaining panels 22 (with the exception of being transparent), and thus they do not change the normal contour of the exterior of the building 15. As a particular example, the transparent panels 28 may comprise a conventional plastic skylight panel, having a width of about 3 feet and a length of about 5½ feet so as to extend between the purlins 20 and leaving a few inches to overlap the panel 22 positioned below, note FIG. 3. Where side-by-side collectors are employed as illustrated, the panels 28 preferably are the normal 11 feet in length so as to extend across two adjacent collectors.

The collector 24 further comprises solar energy absorptive panel means mounted to extend between the two adjacent purlines 20a and 20b and underlying substantially the full area of the transparent exterior panels 28. More particularly, the solar energy absorptive panel means comprises a plurality of individual, generally rectangular panels 30 of a heat conducting material, such as 0.019 gauge diamond embossed aluminum sheeting. Each panel 30 defines a generally planar outer surface 32 facing the transparent exterior panel, an opposite surface 33, opposite end edges 35, 36, and opposite side edges 37, 38. The outer surface 32 is coated with a dark, energy absorbing surface, such as black paint. In addition, each panel 30 is composed of a plurality of U-shaped sections which extend between the end edges, with each section having a planar medial portion 41 and inwardly extending sides 42, 43. The sides of adjacent sections abut and are interconnected by means of an overlapping lip on the side 43, to thereby form a plurality of fins extending outwardly from the opposite surface 33 of the sheet and continuously between the opposite end edges 35, 36. Typically, the fins are equally spaced apart a distance of about 8 inches, and they are about 2 inches in height.

Each panel 30 further includes slot means along the end edge 35 for receiving the other end edge 36 of another like panel therein, whereby a number of panels may be readily joined in an end-to-end arrangement and with the fins extending in a common direction. As best seen in FIG. 8, this slot means preferably comprises a clip 45 having an S-shaped cross-sectional configuration, with the clip being fixedly mounted along the end edge 35 of the panel by a rivet or the like. If desired, the fins of one panel may be laterally offset from the fins of the adjacent panels to facilitate heat transfer to the adjacent airstream as further described below.

The side edges 37, 38 of the panels 30 are offset in a common direction a distance of between about one to five inches, such that the offset side edge portions are co-planar with respect to each other and parallel to the plane of the outer surface 32. These offset side edge portions are adapted to be positioned upon the outside edges of the purlins 20a, 20b and thus underlie the overlapping exterior panels 22 and 28 (note FIG. 7), and serve to provide an insulating air space between the exterior panels 28 and solar energy absorbing panels 30. Also, the extent to which the side edge portions are offset is selected to provide a desired cross-sectional area in the passageway as described below, which in turn is a factor which determines the velocity of the air passing therethrough. The overlapping exterior panels 22 and 28 and panels 30 are attached to the purlins 20a, 20b by means of self-threading screws 46 or the like, note FIG. 7. In this regard, a side edge seal in the form of an elongate foam strip 48 having a configuration corresponding to that of the exterior panel may be positioned intermediate the external panels 28 and offset side edges 37, 38 of the panels 30 to prevent passage of air therebetween and thus form a closed insulating airspace between the panels 28 and 30, note FIG. 6.

The wall collector 24 further includes interior panel means mounted to the inside edges of the two purlins 20a, 20b. This interior panel means is transversely aligned with the exterior panels 28, and comprises a plurality of individual, side-by-side panels 50 formed of a rigid fiberglass ductboard or similar heat insulating material. The panels 50 may be attached by means of clips 52 which extend along the inside edges of the purlins 20a, 20b, or by some other suitable means.

From the above description, it will be seen that the solar energy absorbing panels 30, two purlins 20a, 20b, and interior panels 50 collectively define an enclosed air passageway which extends along the length of the wall 11. As best seen in FIG. 7, the interior panels 50 terminate at the columns 18, and such that the outside face of the columns forms a portion of the passageway. In addition, a suitable partition (not shown) may be mounted between the purlins to close the ends of the passageway, as well as preclude the entry of air between the exterior panels 28 and energy absorbing panels 30. By this arrangement, the passageway is able to continue uninterrupted along the entire length of the wall structure. Also, the fact that the purlins which form the side edge of the passageway are part of the conventional building structure, results in the cost of the collector being minimized.

Inlet means is provided adjacent one end of the passageway for admitting air thereinto, and outlet means is provided adjacent the other end of the passageway for permitting the air to exhaust therefrom. As best seen in FIGS. 1 and 4, the inlet means comprises a first opening 54 communicating with the passageway at the overhang for admitting outside air, and a second opening 56 communicating with the passageway and positioned inside of the enclosure for admitting inside air. In addition, means are provided for selectively closing each of the first and second openings, or opening the same in a predetermined amount, to thereby permit predetermined relative portions of outside air and inside air to be admitted into the passageway, and also to permit selected collectors to be closed and non-operative while others remain open and operative. More particularly, there is provided a damper plate 58 mounted transversely across the passageway within the enclosure and immediately upstream of the second opening 56. The plate 58 is slideably mounted between a pair of parallel angle brackets 59, 60, and extends through a slot (not shown) in the interior panel 50. The brackets 59, 60 include a transverse pin 61 mounted at each end, with the pins being adapted to extend through a selected one of the openings 62 in the damper plate, and such that the damper plate may be moved and secured to close a selected portion of the passageway. When the plate is fully inserted into the passageway, it acts to effectively close the first opening 54.

In the embodiment of FIG. 1, the first or outside opening 54 is formed by the absence of an interior panel 50 or other covering between the purlins 20a and 20b on the overhang, and such that the passageway directly opens to the outside air. The second opening 56 comprises a rectangular aperture formed in the interior panel 50 immediately downstream of the damper plate 58. A door 64 is hingedly mounted to the periphery of the second opening, and as will be apparent, the door 64 may be closed to close the second opening, or opened a predetermined amount to admit air from the inside of the building enclosure into the passageway. As illustrated, the damper plates 58 and doors 64 are adapted to be moved by hand. It will be understood however that suitable motorized controls of conventional design (not shown) may be used for this purpose if desired.

In the embodiment of FIG. 5, the underside of the overhang is formed into a box-like enclosure at the entry end of each collector by suitable panels, and the first opening comprises a rectangular opening 66 formed in each such enclosure. A door (not shown) similar to the door 64 may if desired be mounted to cover each opening 66 and thereby permit the same to be more completely closed than would be the case with only the damper plate 58.

The building structure of the present invention preferably includes a plenum chamber positioned within the enclosure and communicating with the outlets of each of the collectors. In the embodiment of of FIG. 1, a plenum chamber 68 is defined between the end wall 14 and an adjacent, parallel interior wall panel 70. The wall panel 70 may be substantially coextensive in area with the end wall 14, and such that the plenum chamber acts not only to efficiently collect the air from the several collectors 24, 26, but also as an insulating air space. Also, the wall panel 70 and end wall 14 may each include a suitable door (not shown) to permit passage of personnel therethrough.

A conventional air blower 72 is mounted within the enclosure and communicates with the plenum chamber 68. Thus operation of the blower acts to convey air through each of the passageways, into and through the plenum chamber 68, and into the enclosure for heating purposes. More particularly, solar energy passes through the transparent exterior panels 28 of the collectors, and warms the solar energy absorbing panels 32, and the air passing along the passageways contacts the finned surfaces of the panels and absorbs heat therefrom. The heated air is then conveyed through the plenum chamber 68 and into the building enclosure for heating purposes.

FIG. 5 illustrates a second embodiment of the invention, and wherein the collectors are disposed only in the roof wall 15, and the plenum chamber 68 is disposed only within the upper portion of the enclosure.

FIGS. 9–12 illustrate a number of different configurations of the plenum chambers at the outlet ends of the collectors, as well as an alternative construction by which varying proportions of inside and outside air may be introduced into the collectors. More particularly, FIG. 9 illustrates an embodiment wherein the collectors 26a extend for about one half the length of the building, with the outlets disposed centrally in the building. In this instance, the outlets are formed simply by the absence of interior panels 50, and the plenum chamber 74 comprises a box-like enclosure suspended from the roof walls and which encompasses each of the outlets. Suitable blowers 76 are mounted in the chamber 74 for drawing air through the collectors and directing the heated air into the room for heating purposes. The end walls of the building may include adjustable exhaust vents 78, whereby outside air may be continuously circulated through the building. As is the case with all of the illustrated embodiments, conventional unit heaters (not shown) may if desired be employed in association with the blowers 76 to supplement the heat supplied to the building.

In FIG. 10, there is provided a wall panel 80 parallel to and adjacent the building end wall 14, and which defines a plenum chamber 81 communicating with the inlets of each of the collectors 26b. The panel 80 and end wall 14 each include an adjustable damper 82, whereby varying proportions of inside and outside air may be admitted into the collectors. Also, the outlet plenum chamber 84 is disposed at the opposite end of the building structure and communicates with the outlet end of each collector 26b, and suitable ductwork 85 is provided for conveying the heated air from the plenum chamber to a separate office 86 and the remaining portion of the interior of the building.

FIG. 11 illustrates a building structure having an inlet plenum chamber 88 similar to the chamber 81 of FIG. 10, together with a similarly constructed outlet plenum chamber 89, and whereby predetermined proportions of outside and inside air may be circulated through the building by adjustment of the dampers 90. The building structure of FIG. 12 includes only the outlet plenum chamber 91, with dampers 92 for venting predetermined proportions of the air outside and into the building.

FIG. 13 illustrates a further embodiment of the present invention, and wherein the building structure houses an apparatus 94 for drying organic materials. The apparatus 94 is itself conventional, and includes a burner and air circulation system for heating and drying crops, such as corn, soy beans, or wood. Alternatively, the apparatus 94 may be designed to dry organic waste and other organic materials. As illustrated, the outlets from the collectors 26c communicate with the outlet plenum chamber 95 and a blower 96 is provided for drawing the air through the collectors and delivering the heated air to the apparatus 94. By this arrangement, pre-heated air is supplied to the apparatus 94 from the collectors 26c. The exhaust from the apparatus is directed through a heat exchanger 96 positioned in an inlet plenum chamber 97, whereby a portion of the heat energy in the exhaust is recovered by the heating of the entering air.

FIG. 14 shows a building structure similar to that of FIG. 10, but wherein the crop drying apparatus 94 is disposed exterior of the building. In this case, the fans 98 draw the air through the collectors 96d and plenum chamber 99, and the heated air is then passed through the apparatus 94. The wall panel 100 forming the outlet plenum chamber includes an opening 102 which may be opened to permit the heated air from the collectors 26d to enter the remaining portion of the building when the crop drying apparatus 94 is not in operation. In this latter instance, a suitable blower (not shown) would be positioned either at the opening 102 or at the inlet of the passageway 26d for conveying the air through the system.

In the drawings and specification, there has been set forth a preferred embodiment of the invention, and although specific terms are employed, they are used in a generic and descriptive sense only and not for purposes of limitation.

That which is claimed is:

1. A building structure having a solar energy collector integrally incorporated therein, and wherein the solar energy collector is characterized by the absence of components which protrude outwardly beyond the normal contour of the building structure, and comprising
    a plurality of exterior wall structures collectively defining an enclosure therebetween, each of said wall structures comprising a plurality of parallel, spaced apart structural support members,
    a plurality of solar energy collectors disposed in said exterior wall structures, each of said collectors comprising
        (a) exterior panel means which are transparent to solar radiation mounted to the outside edges of two adjacent support members and overlying a substantial portion of the area therebetween,
        (b) interior panel means mounted to the inside edges of said two adjacent support members and being generally parallel to and transversely aligned with said exterior panel means, and
        (c) solar energy absorptive panel means mounted parallel to and intermediate said exterior and interior panel means, such that an air passageway is defined by said two adjacent support members, interior panel means, and solar energy absorptive panel means,
    inlet means adjacent corresponding ends of each of said collectors for admitting air into the associated passageway,
    outlet means adjacent the opposite corresponding ends of each of said collectors for permitting air to exhaust from the passageway,
    a plenum chamber disposed within said enclosure and communicating with each of said outlet means of said collectors, and
    means operatively communicating with said plenum chamber for conveying air along said passageway of each collector from said inlet means to said outlet means thereof, and so as to be in heat transfer relationship with said solar energy absorptive panel means, whereby the solar energy is able to pass through said exterior panel means and warm said solar energy absorptive panel means, and the air passing through said passageways absorbs heat from said solar energy absorptive panel means and exhausts into said plenum chamber.

2. The building structure as defined in claim 1 wherein said wall structures include a pair of opposite side walls, opposing end walls, and at least one roof wall, and wherein at least one collector is disposed in each of one of said side walls and said roof wall.

3. The building structure as defined in claim 1 wherein said wall structures include a pair of opposite side walls, opposing end walls, and at least one roof wall, and wherein said plenum chamber comprises at least a portion of one of said end walls, at least a portion of said roof wall, and a wall panel disposed within said enclosure and parallel to and adjacent said one end wall.

4. The building structure as defined in claim 3 wherein said wall panel is substantially co-extensive in area with said one end wall.

5. The building structure as defined in claim 1 wherein said wall structures include a pair of opposite side walls, opposing end walls, and at least one roof wall, and wherein said outlet means of said collectors and said plenum chamber are disposed at a location within said enclosure which is spaced from each of said end walls.

6. The building structure as defined in any one of claims 1 through 5 wherein said plenum chamber communicates with the interior of said enclosure, and whereby the air passing through said passageways exhausts into said enclosure.

7. The building structure as defined in any one of claims 1 through 5 wherein each of said wall structures having a collector disposed therein further comprises nontransparent exterior panel means mounted to the outside edges of said support members such that said transparent exterior panel means and non-transparent exterior panel means are substantially coplanar and collectively cover the exterior surface of such wall structures.

8. The building structure as defined in claim 1 wherein said solar energy absorptive panel means comprises a generally flat metallic sheet having a dark, energy absorbing surface facing said transparent exterior panel means, and said interior panel means comprises a heat insulating material.

9. The building structure as defined in claim 8 wherein said solar energy absorptive panel means further comprises integrally formed fins positioned on the side of the sheet facing said passageway and extending in a direction parallel to the direction of the air flow therethrough, whereby the fins act to facilitate heat transfer to the air passing through said passageway.

10. The building structure as defined in claim 1 wherein said conveying means comprises blower means disposed within said enclosure and operatively connected directly to said plenum chamber for exhausting the air therefrom and to thereby draw air through said passageway.

11. The building structure as defined in claim 1 wherein said inlet means comprises means for selectively admitting predetermined relative portions of outside air and inside air into said passageway.

12. The building structure as defined in claim 1 further comprising means for drying organic materials, and wherein said conveying means includes means for directing the air from said plenum chamber into said drying means.

13. The building structure as defined in claim 12 further comprising heat exchange means operatively disposed between the exhaust of said drying means and said passageway inlet means, for preheating the air entering through said inlet means.

14. A building structure having a solar energy collector integrally incorporated therein, and wherein the solar energy collector is characterized by the absence of components which protrude outwardly beyond the normal contour of the building structure, and comprising a plurality of exterior wall structures collectively defining an enclosure therebetween, each of said wall structures comprising a plurality of parallel, spaced apart structural support members, at least one solar energy collector disposed in said exterior wall structures, each of said collectors comprising (a) exterior panel means which are transparent to solar radiation mounted to the outside edges of two adjacent support members and overlying a substantial portion of the area therebetween, (b) interior panel means mounted to the inside edges of said two adjacent support members and being generally parallel to and transversely aligned with said exterior panel means, (c) solar energy absorptive panel means mounted parallel to and intermediate said exterior and interior panel means, such that an air passageway is defined by said two adjacent support members, interior panel means, and solar energy absorptive panel means, inlet means operatively associated with each of said collectors for admitting both outside air and inside air into one end of the associated passageway, and including means for selectively admitting predetermined relative portions of outside air and inside air thereinto, outlet means operatively associated with the opposite end of the passageway of each of said collectors for permitting air to exhaust therefrom, and means for conveying air along said air passageway of each collector from said inlet means to said outlet means and into said enclosure, and so as to be in heat transfer relationship with said solar energy absorptive panel means, whereby the solar energy is able to pass through said exterior panel means and warm said solar energy absorptive panel means, and the air passing through said passageway absorbs heat from said solar energy absorptive panel means and exhausts into said enclosure.

15. The building structure as defined in claim 14 wherein each of said wall structures having a collector disposed therein extends beyond and adjacent perpendicular wall structure to define an overhang, and wherein said inlet means comprises a first opening communicating with said passageway of each collector and positioned on said overhang for admitting outside air, and a second opening communicating with each passageway and positioned inside said enclosure for admitting inside air.

16. The building structure as defined in claim 14 wherein said means for selectively admitting predetermined relative portions of outside air and inside air comprises means for selectively opening each of said first and second openings.

17. The building structure as defined in claim 16 wherein said means for selectively opening each of said first and second openings comprises a damper plate disposed transversely to said passageway and slideably mounted to extend into and close said passageway upstream of said second opening to a predetermined degree, and a door panel hingedly mounted to the periphery of said second opening.

18. The building structure as defined in either of claims 1 or 14 wherein each of said wall structures further comprises a plurality of parallel, spaced apart structural beams, and wherein said support members are attached to and extend perpendicularly between said structural beams.

19. The building structure as defined in claim 18 wherein said support members extend horizontally with respect to the ground surface.

* * * * *